(12) United States Patent
Dallal et al.

(10) Patent No.: US 11,349,688 B2
(45) Date of Patent: May 31, 2022

(54) TRANSMISSION RATE CONTROL BASED ON EMPIRICAL MI ESTIMATION

(71) Applicant: QUALCOMM Incorporated, San Diego, CA (US)

(72) Inventors: Yehonatan Dallal, Kfar Saba (IL); Shay Landis, Hod Hasharon (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/035,432

(22) Filed: Sep. 28, 2020

(65) Prior Publication Data
US 2022/0103399 A1    Mar. 31, 2022

(51) Int. Cl.
*H04L 25/02* (2006.01)
*H04L 25/03* (2006.01)
*H04L 27/26* (2006.01)

(52) U.S. Cl.
CPC ........ *H04L 25/024* (2013.01); *H04L 25/0204* (2013.01); *H04L 25/03006* (2013.01); *H04L 27/2695* (2013.01); *H04L 2025/03815* (2013.01)

(58) Field of Classification Search
CPC ............. H04L 25/024; H04L 25/03006; H04L 25/0204; H04L 27/2695; H04L 2025/03815
See application file for complete search history.

(56) References Cited

U.S. PATENT DOCUMENTS

| | | | | |
|---|---|---|---|---|
| 7,483,674 | B2 * | 1/2009 | Haartsen | H04B 17/382 455/450 |
| 9,300,371 | B1 * | 3/2016 | Zhang | H04L 27/0008 |
| 10,027,372 | B2 * | 7/2018 | Gorokhov | H04B 1/7103 |
| 10,952,247 | B2 * | 3/2021 | Frenger | H04L 5/0055 |
| 2016/0094895 | A1 * | 3/2016 | Stadelmeier | H04N 21/23614 725/33 |
| 2017/0005715 | A1 * | 1/2017 | Cezanne | H04L 27/265 |
| 2018/0083810 | A1 * | 3/2018 | Wun | H04L 1/0003 |
| 2019/0173606 | A1 * | 6/2019 | Jakubov | H04L 1/0025 |

\* cited by examiner

*Primary Examiner* — Jean B Corrielus
(74) *Attorney, Agent, or Firm* — Procopio, Cory, Hargreaves & Savitch

(57) ABSTRACT

A first wireless device may generate a first pseudo-random data based on a seed known to a second wireless device, and may transmit a first training signal including first pseudo-random data to the second wireless device for a MI estimation at the second wireless device, the first pseudo-random data being modulated with a first modulation order. The second wireless device may estimate, based on the received first training signal and through the MI estimation, a reception quality associated with at least one modulation order lower than or equal to the first modulation order, and determine a second modulation order of the at least one modulation order lower than or equal to the first modulation order based on the MI estimation, the second modulation order being estimated to provide a reception quality greater than or equal to a reception quality threshold. The MI estimation may be periodic or aperiodic.

89 Claims, 10 Drawing Sheets

TRANSMISSION RATE CONTROL BASED ON EMPIRICAL MI ESTIMATION

BACKGROUND

Technical Field

The present disclosure relates generally to communication systems, and more particularly, to a transmission rate control based on empirical mutual information (MI) estimation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. A first wireless device may generate a first pseudo-random data based on a seed known to a second wireless device, and may transmit a first training signal including first pseudo-random data to the second wireless device for a MI estimation at the second wireless device, the first pseudo-random data being modulated with a first modulation order. The second wireless device may estimate, based on the received first training signal and through the MI estimation, a reception quality associated with at least one modulation order lower than or equal to the first modulation order, and determine a second modulation order of the at least one modulation order lower than or equal to the first modulation order based on the MI estimation, the second modulation order being estimated to provide a reception quality greater than or equal to a reception quality threshold. The MI estimation may be periodic or aperiodic.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
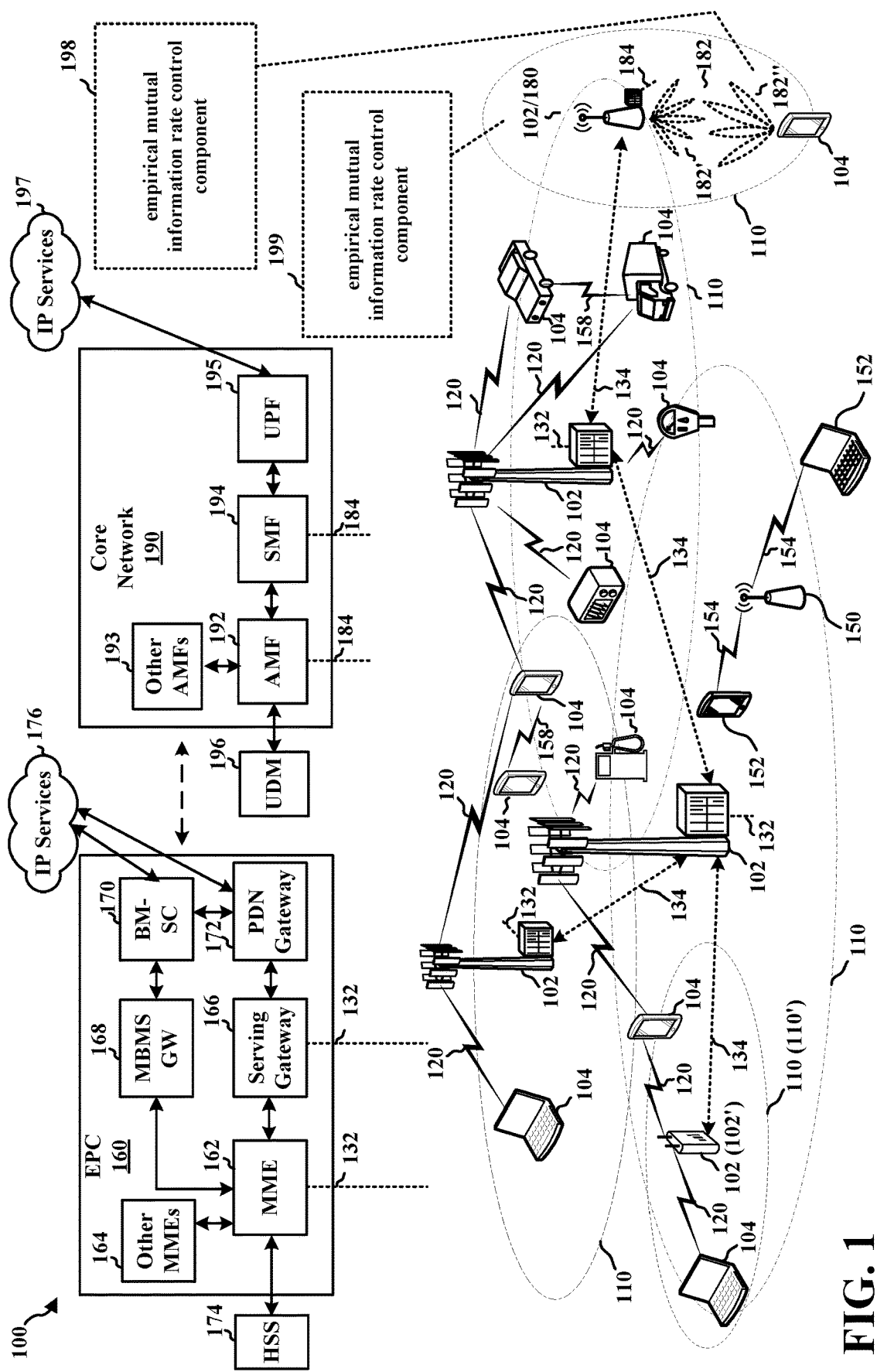
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include an empirical mutual information rate control component 199 configured to generate a pseudo-random data based on a seed known to the UE 104, and transmit a training signal including the pseudo-random data to the UE 104 for a MI estimation at the UE 104, the pseudo-random data being modulated with a first modulation order. In certain aspects, the UE 104 may include an empirical mutual information rate control component 198 configured to receive the training signal and estimate, based on the received training signal and through the MI estimation, a reception quality associated with at least one modulation order lower than or equal to the first modulation order, and determine a second modulation order of the at least one modulation order lower than or equal to the first modulation order based on the MI estimation, the second modulation order being estimated to provide a reception quality greater than or equal to a reception quality threshold. The MI estimation may be periodic or aperiodic. Although the following description may be focused on 5G NR, the concepts described herein may be applicable to other similar areas, such as LTE, LTE-A, CDMA, GSM, and other wireless technologies.

Figure 2:
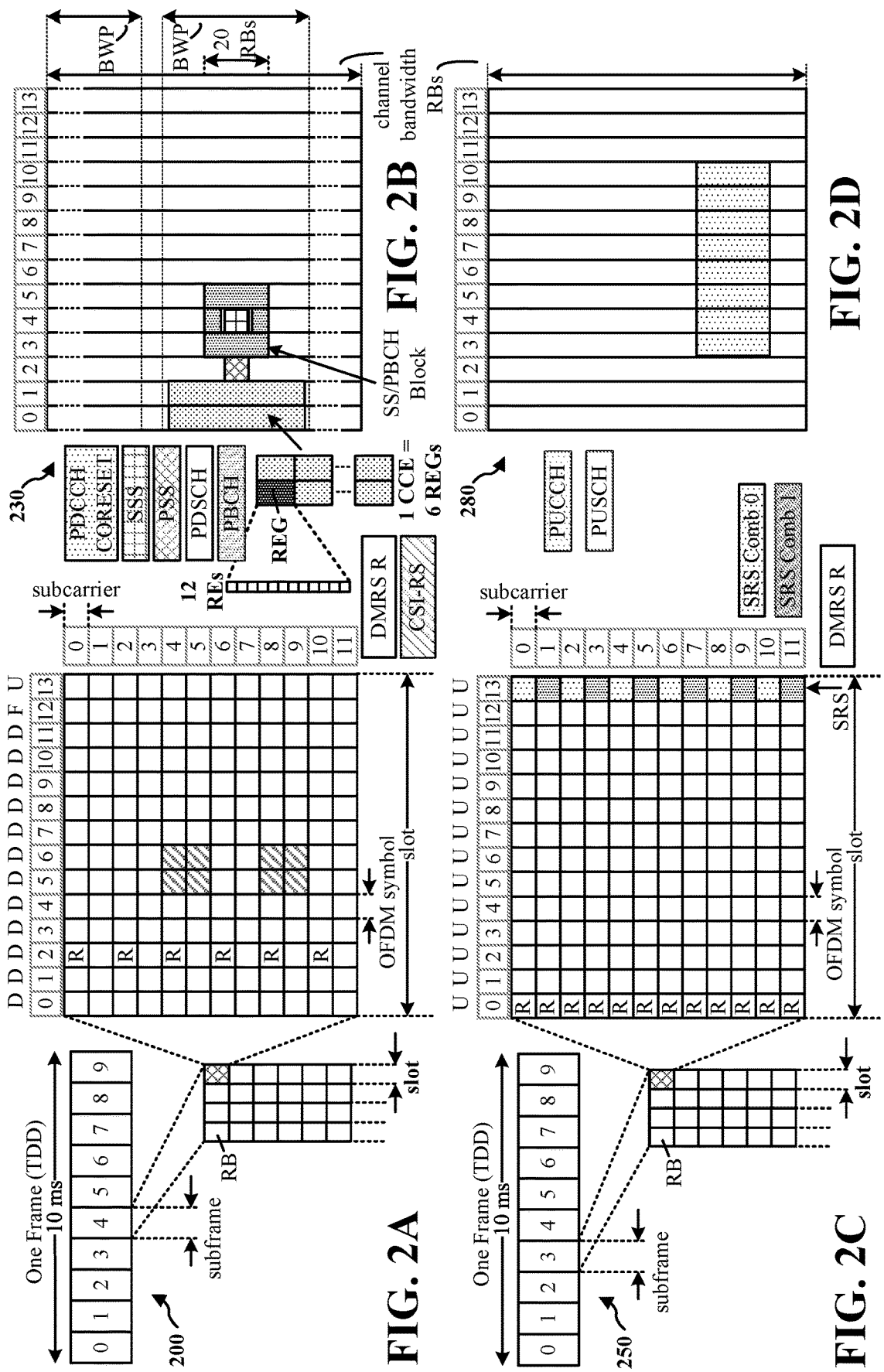
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
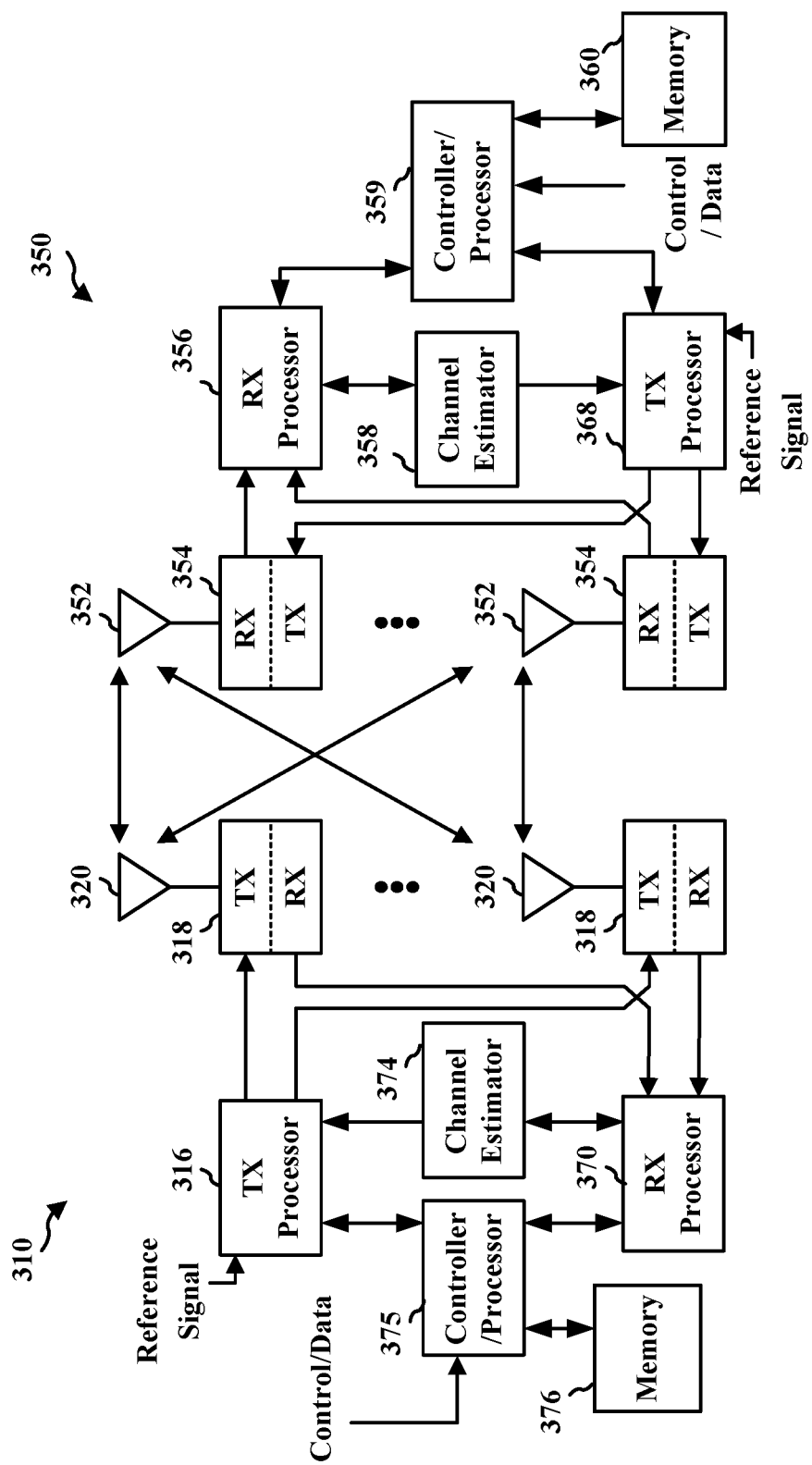
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

A modulation and coding scheme (MCS) may define the number of bits which can be carried by each symbol. Each symbol may include resource elements and the MCS may define how many bits can be transmitted per the resource element. The MCS may depend on a radio signal quality in a wireless link. That is, a base station may determine to use a higher MCS (e.g., a higher modulation rate and/or a higher coding rate) to transmit more bits in each symbol when the wireless link has better quality, and/or determine to use a lower MCS (e.g., a lower modulation rate and/or a lower coding rate) to transmit less bits in each symbol when the wireless link has a bad quality.

The base station may determine the modulation rate and/or the coding rate of the MCS. The base station may determine to control the rate of the modulation and coding using various approaches. In one aspect, the base station may use a minstrel-like method (e.g., for a WiFi network connection), and the base station may first initiate the rate change to increase the modulation rate and reduce the modulation rate if the base station determines that the transmission signal based on the increased modulation rate has too many errors or transmission failures. Ongoing negotiation and adjustment of the rate may be performed while the link is open. Accordingly, the rate adjusts to the changing condition of the channel.

In another aspect, the base station may use a rate estimation to determine the modulation rate and/or the coding rate (e.g., CSI-RS in LTE or 5G NR). The rate estimation is a feedforward method that may be dependent on a Gaussian noise model. That is, a controller at the base station may send a reference signal (or a pilot signal) such as CSI-RS, and the UE may try to estimate the condition of the channel based on at least one measurement of the reference signal, including a signal-to-noise ratio (SNR), and determine the channel viability, number of antennas, number of beams to be used. The UE may send a channel status report to the base station, and base station may determine the modulation rate and/or the coding rate. This is an indirect way to estimate the quality of channel and the rate that can be supported. The physical level rate estimation is configured to assume the noise and/or interference with Gaussian statistics. When the noise is a white noise, and the noise is within a white band with Gaussian statistics, the rate estimation scheme may work fine. However, the interference may be a dominant factor, and the statistics of the interference may be different from the Gaussian noise. For example, when the base station and the UE use a low modulation rate based on an on-off keying (OOK), the interference may dominantly be non-Gaussian noise, and the signal to interference metric may not be used to predict the modulation rate and/or coding rate. Therefore, the simple rate estimation may not be effective in determining the modulation rate and/or the coding rate.

Accordingly, a different rate estimation scheme may be necessary to correctly estimate the achievable rate in such scenarios.

In some aspects, an empirical mutual information (MI) estimation may be provided for rate control. According to the empirical MI estimation, a direct measurement of the mutual information subject to the transmitter and the receiver design may be used to estimate the approachable information transfer rate, instead of estimating the channel state by using energy or an error rate measurement. Therefore, the base station and the UE may perform the rate control without an estimation or a feedback process. The training signal may actually convey data to the UE as a predefined signal, such as the pseudo-random sequence that can be generated at the base station and UE.

In one aspect, a transmission side (e.g., the base station) may transmit a training signal (or waveform) with certain standardized and/or predefined pseudo-random data content to a reception side (e.g., the UE). Here, the pseudo-random data may refer to a known sequence that can be generated independently using a seed shared between the transmission side and the receiving side. That is, a unique sequence may be transmitted on each of the active beams/links. In comparison, the rate estimation may use a pilot signal, which has the same predetermined power level for all symbols. According to the empirical MI estimation, the training signal may include the pseudo-random data that may have different power levels for each symbol corresponding to the pseudo-random data.

The transmission side may also simulate non-Gaussian interference noise by transmitting or receiving signal with relevant wireless devices or instructing the relevant wireless devices to transmit signal. The transmission side in a multi-user (MU) MIMO (MU-MIMO) may simulate non-Gaussian interference noise by transmitting or receiving signal with relevant wireless devices. The relevant wireless devices may include other base station and/or other UEs that may transmit or receive signals that may cause non-Gaussian interference to the transmission side and the reception side.

In another aspect, the reception side (e.g., UE) of the empirical MI estimation may perform detection on all of its dedicated links/beams. The reception or receiving side may use various detection schemes, including from a hard decision to a full log-likelihood ratio (LLR) extraction, according to the power/performance balance of the receiver. The empirical MI for each receiver approach can be measured and used later for a receiver specific rate-control decision. The receiver may apply the decoding scheme to decode the training signal. The actual MI estimation may reflect the actual transmission interference as well as the receiver properties. For example, the UE may enter a power-saving mode and use a simpler decoding scheme than usual (e.g., use one antenna and perform the hard decision rather than the full LLR extraction). Then the UE may use the same decoding scheme to decode the training signal, and the measurement of the mutual information may reflect the effect of the decoding scheme used by the UE.

Accordingly, the base station may modulate and transmit the pseudo-random data as a normal data transmission, and the receiver may apply the decoding scheme to decode the transmitted training signal. The MI measurement result may consist of an achievable rate, and may not specify an actual coding scheme. The actual modulation and coding scheme may be determined based on the empirical MI measurement result.

While the empirical MI estimation may be performed for a specific modulation scheme (e.g., M-QAM, ON-OFF keying (OOK), etc.), the UE may also use hierarchical modulation or a similar approach to measure (or estimate) the MI per modulation bits, from a most significant bit (MSB) to a least significant bit (LSB). Although this MI estimation may be less accurate than using a single modulation for the measurement, the UE may make parallel measurements for all modulation orders in the same scheme, which may be equal to or lower than the one used during the MI estimation.

Accordingly, by providing an accurate and information-theory based estimation of the achievable rate in non-Gaussian noise scenarios, the base station may provide an improved rate estimation for non-Gaussian interference and noise, which may not be possible by taking into account the interference to signal ratio by measuring the energy level of the received reference signal. Furthermore, the empirical MI estimation may not suffer from the delay, as in the Minstrel-like method.

Figure 4:
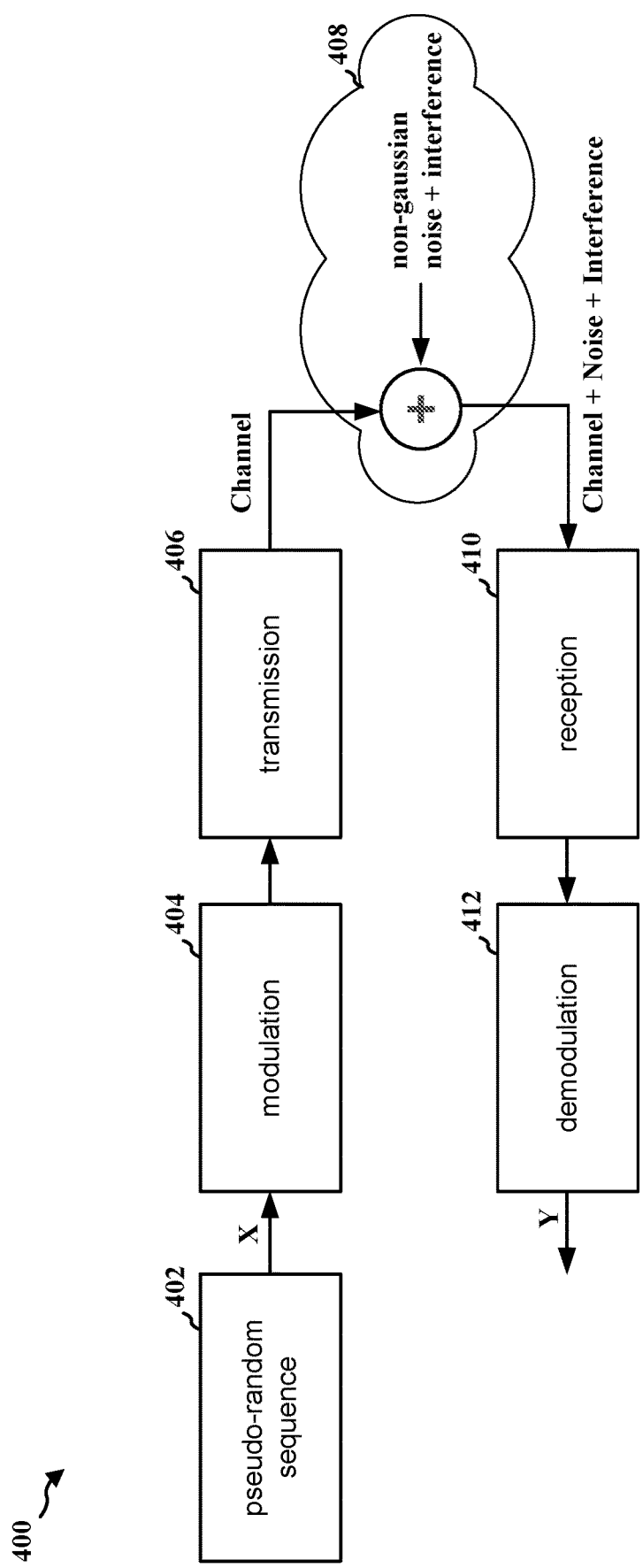
FIG. 4 illustrates an example concept of empirical mutual information estimation of wireless communication.

FIG. 4 illustrates an example concept of empirical mutual information estimation 400 of wireless communication. From a transmission side (e.g., a base station), the pseudo-random sequence 402 may be modulated through the modulation 404 to generate a training signal, and the training signal may be transmitted through the transmission 406 to a reception side (e.g., a UE) through a transmission channel of a wireless communication 408. The training signal may be transmitted through the transmission channel of the wireless communication 408, and non-Gaussian noise and interference may be added to the training signal. The receiving side may receive the training signal with the non-Gaussian noise and interference added through the reception 410 and demodulate the received training signal through the demodulation 412. Here, X may indicate the bits of the pseudo-random sequence 402 or a modulated constellation points of the training signal. Also, Y may indicate the received signal post equalization or the demodulated hard bits or LLRs, depending on the decoding scheme of the reception side.

The receiving side may calculate or estimate the empirical mutual information between the training signal received from the transmitting side and a pseudo-random data generated based on the seed. For example, the receiving side may calculate or estimate the empirical mutual information of X and Y as a double integral using the following formula:

$$I(X;Y) = \int\int dxdy p(x,y)\log\left(\frac{p(x,y)}{p(x)p(y)}\right)$$

Here, p(x, y) indicates a joint probability density function of X and Y, and p(x) and p(y) are marginal probability density functions of X and Y, respectively.

Figure 5:
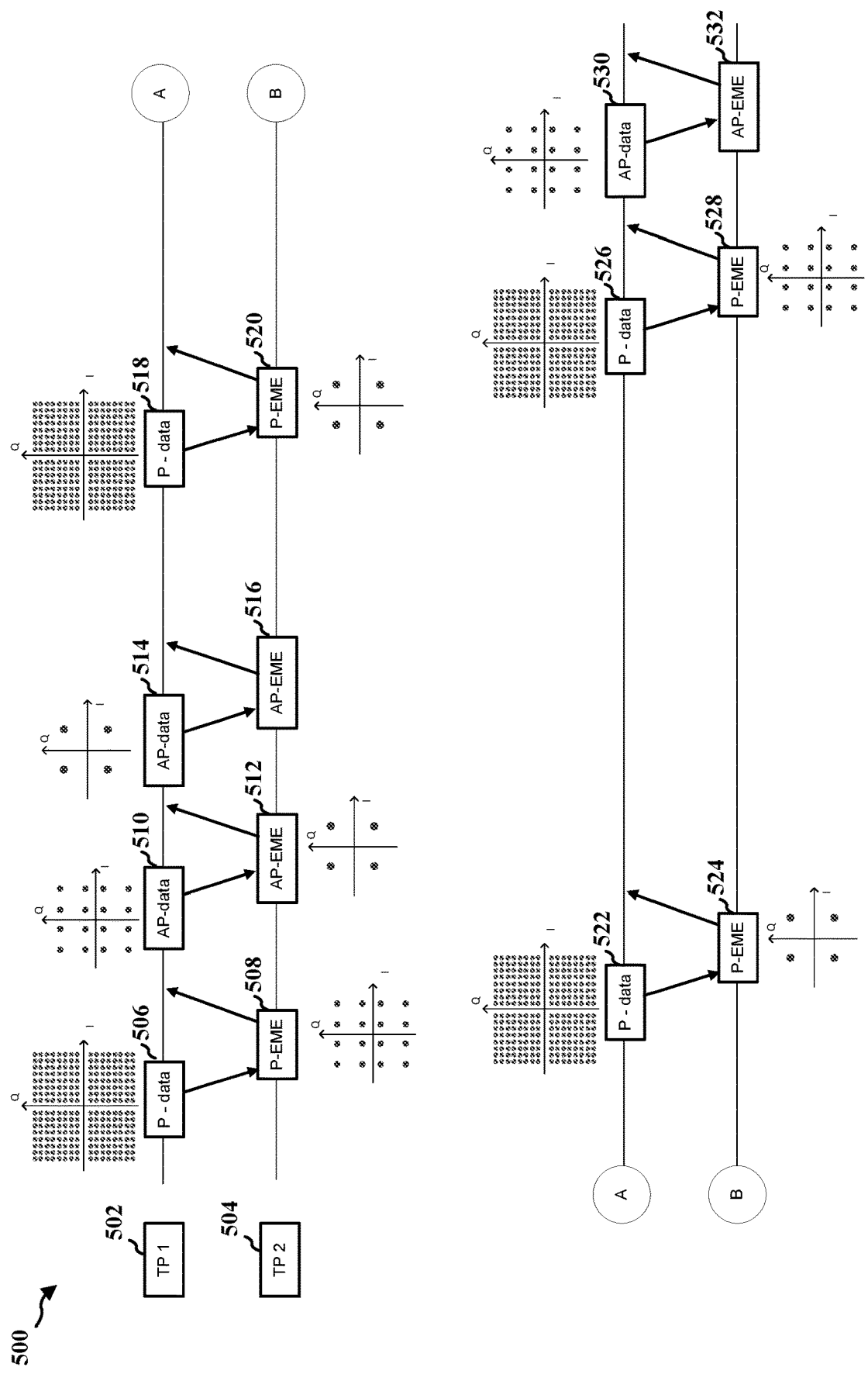
FIG. 5 illustrates an example of empirical mutual information estimation of wireless communication.

FIG. 5 illustrates an example of empirical mutual information estimation 500 of wireless communication, including a first transmission point (TP) 502 and a second TP 504. For example, the first TP 502 may be a base station and the second TP 504 may be a UE.

In some aspects, the empirical MI estimation timeline can rely on the principles as the channel state feedback, and may be periodic or aperiodic. In one aspect, a periodic empirical MI estimation may be configured for coarse estimation. For example, in the periodic empirical MI estimation, the first TP 502 may modulate the pseudo-random data with the highest modulation possible, and the second TP 504 may perform a hierarchical demodulation to measuring the MI per modulation bit, from the MSB to the LSB. In another aspect, an aperiodic empirical MI estimation may be configured for estimation refinement. For example, the first TP 502 may modulate the pseudo-random data according to the modulation of interest. For example, the first TP 502 may use one of the modulation order recommended by the coarse estimation from the periodic empirical MI estimation, the current modulation (for rate refinement), or a higher or lower modulation estimation.

For example, the first TP 502 may, at 506, initiate the periodic empirical MI estimation and generate a training signal by modulating a pseudo-random data based on 64 QAM. The second TP 504 may receive the training signal from the first TP 502, and at 508, perform the periodic empirical MI estimation, and determine that 16 QAM returns the greatest achievable rate from the periodic empirical MI estimation. The second TP 504 may transmit a first request to the first TP 502 that data transmissions to the second wireless device have the modulation of the 16 QAM.

Subsequently, the first TP 502 may, at 510, initiate the aperiodic empirical MI estimation and generate a training signal by modulating a pseudo-random data based on 16 QAM, as requested by the second TP 504. The second TP 504 may receive the training signal from the first TP 502, and at 512, perform the aperiodic empirical MI estimation, and determine that QPSK returns a better achievable rate from the periodic empirical MI estimation. The second TP 504 may transmit a second request to the first TP 502 that data transmissions to the second wireless device have the modulation of the QPSK.

In response to receiving the second request that data transmissions to the second wireless device have the modulation of the QPSK, the first TP 502 may initiate another aperiodic empirical MI estimation for a coding rate. The first TP 502, at 514, may generate a training signal by modulating a pseudo-random data based on QPSK, as requested by the second TP 504. The second TP 504 may receive the training signal from the first TP 502, and at 516, perform the aperiodic empirical MI estimation, to determine the first coding rate. The second TP 504 may transmit a third request to the first TP 502 that data transmissions to the second wireless device have the first coding rate.

At 518 and 522, the first TP 502 may initiate the periodic empirical MI estimation. The second TP 504 may receive the training signal from the first TP 502, and at 520 and 524, perform the periodic empirical MI estimation and return the same modulation order of QPSK to the first TP 502. Accordingly, the first TP 502 may determine that the aperiodic empirical MI estimation is not necessary.

At 526, the first TP 502 may initiate the periodic empirical MI estimation, and generate a training signal by modulating a pseudo-random data based on the QPSK. The second TP 504 may receive the training signal from the first TP 502, and at 528, perform the periodic empirical MI estimation, and determine that 16 QAM returns the greatest achievable rate from the periodic empirical MI estimation. The second TP 504 may transmit a fourth request to the first TP 502 that data transmissions to the second wireless device have the modulation of the 16 QAM.

The first TP 502 may receive the fourth request from the second TP 504 and determine to initiate an aperiodic empirical MI estimation for a coding rate. The first TP 502, at 530, may generate a training signal by modulating a pseudo-random data based on QPSK, as requested by the second TP 504. The second TP 504 may receive the training signal from the first TP 502, and at 532, perform the aperiodic empirical MI estimation, to determine the second coding rate. The second TP 504 may transmit a fourth request to the first TP 502 that data transmissions to the second wireless device have the second coding rate.

Furthermore, during the periodic empirical MI estimation and the aperiodic empirical MI estimation, different training data or signals may be sent simultaneously over all the links/antenna ports to emulate the self-mutual interference during the actual data transmission. Furthermore, the first TP 502 may simulate non-Gaussian interference noise by transmitting or receiving signal with relevant TPs or instructing the relevant TPs to transmit signal. That is, the transmission side in a multi-user (MU) MIMO (MU-MIMO) may simulate non-Gaussian interference noise by transmitting or receiving signal with relevant wireless devices. The relevant TPs may include other base station and/or other UEs that may receive or transmit signals that may cause non-Gaussian interference to the transmission side and the reception side.

Figure 6:
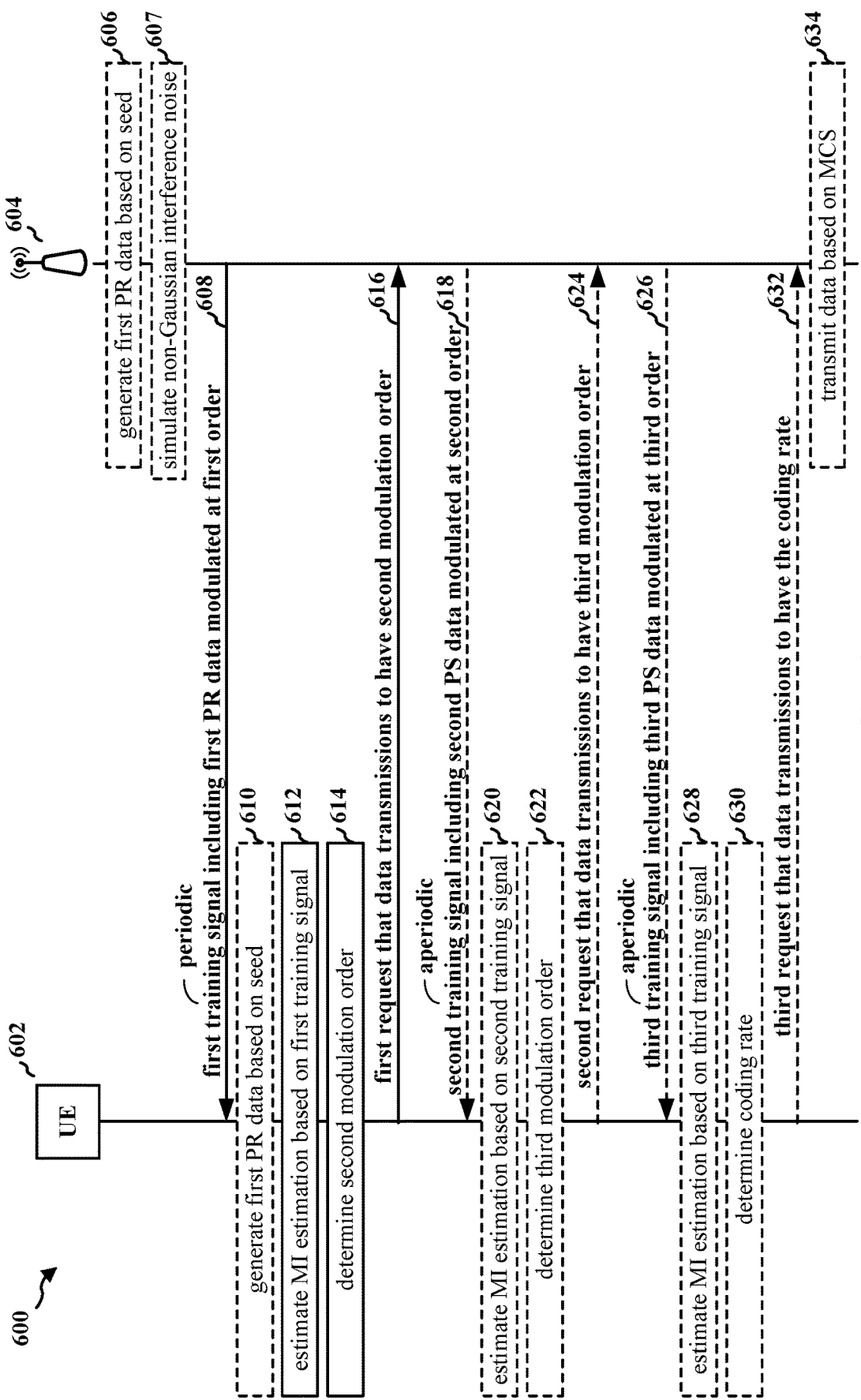
FIG. 6 is a call-flow diagram of wireless communication.

FIG. 6 is a call-flow diagram 600 of wireless communication, including a UE 602 and a base station 604. At 606, the base station 604 may generate first pseudo-random data based on a seed known to the UE 602. At 607, the base station 604 may simulate non-Gaussian interference noise by transmitting or receiving signal with relevant wireless devices or instructing the relevant wireless devices to transmit signal. At 608, the UE may periodically receive a first training signal including first pseudo-random data from a base station, the first pseudo-random data being modulated with a first modulation order. At 610, the UE may generate the first pseudo-random data based on a seed known to the second wireless device. At 612, the UE may estimate, based on the received first training signal and through an MI estimation, a reception quality associated with at least one modulation order lower than or equal to the first modulation order. At 614, the UE may determine a second modulation order of the at least one modulation order lower than or equal to the first modulation order based on the MI estimation, the second modulation order being estimated to provide a reception quality greater than or equal to a reception quality threshold. At 616, the UE may transmit, to the base station, a first request that data transmissions to the second wireless device have the second modulation order.

At 618, the UE may aperiodically receive data from the base station, the data being modulated with the second modulation order. At 620, the UE may estimate, based on the received second training signal and through the MI estimation, a reception quality associated with at least one modulation order lower than or higher than the second modulation order. At 622, the UE may determine a third modulation order of the at least one modulation order lower than or higher than the second modulation order based on the MI estimation, the third modulation order being estimated to provide a reception quality greater than or equal to the reception quality threshold and greater than a reception quality associated with the second modulation order. At 624, the UE may transmit, to the base station, a second request that data transmissions to the second wireless device have the third modulation order.

At 626, the UE may aperiodically receive a third training signal including third pseudo-random data modulated with the third modulation order from the base station. At 628, the UE may estimate, based on the received third training signal and through the MI estimation. At 630, the UE may determine, based on the MI estimation, a specific coding rate when data is received that is modulated with the third modulation order. At 632, the UE may transmit, to the base station, a third request that data transmissions to the second wireless device have the specific coding rate. At 634, the base station may transmit data to the UE based on the third modulation order and the specific coding rate.

Figure 7:
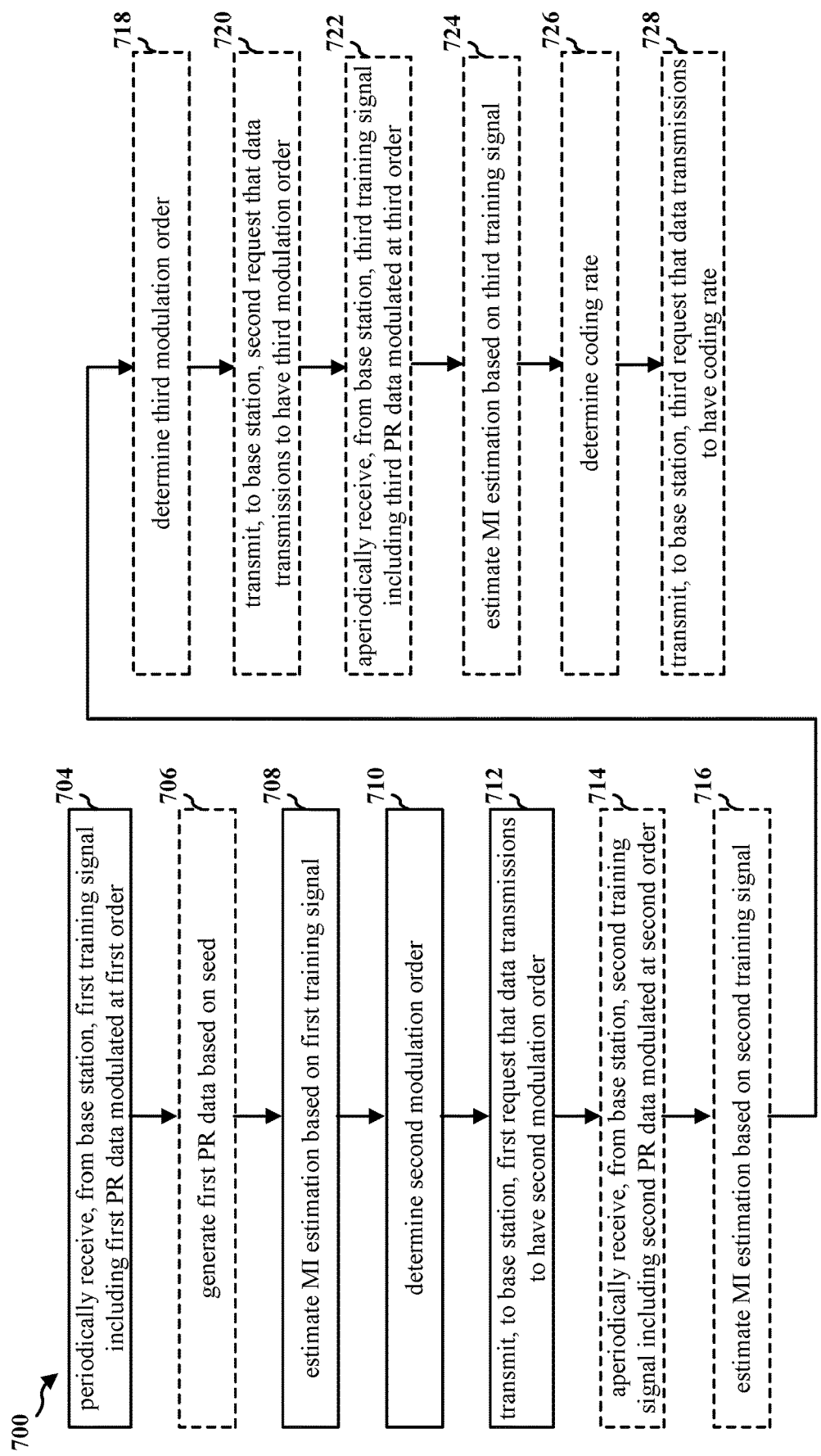
FIG. 7 is a flowchart of a method of wireless communication.

FIG. 7 is a flowchart 700 of a method of wireless communication. The method may be performed by a UE or a component of a UE (e.g., the UE 104; the apparatus 802).

At 704, the UE may periodically receive a first training signal including first pseudo-random data from a base station, the first pseudo-random data being modulated with a first modulation order (e.g., as at 608). The first modulation order may be a highest modulation order. The first training signal may be received through each communication link with the base station. For example, 704 may be performed by a pseudo-random data and training signal component 840.

At 706, the UE may generate the first pseudo-random data based on a seed known to the second wireless device (e.g., as at 610). The MI estimation may be based on comparing the generated first pseudo-random data with the first pseudo-random data received in the first training signal. For example, 706 may be performed by the pseudo-random data and training signal component 840.

At 708, the UE may estimate, based on the received first training signal and through an MI estimation, a reception quality associated with at least one modulation order lower than or equal to the first modulation order (e.g., as at 612). For example, 708 may be performed by an empirical mutual information component 842.

At 710, the UE may determine a second modulation order of the at least one modulation order lower than or equal to the first modulation order based on the MI estimation, the second modulation order being estimated to provide a reception quality greater than or equal to a reception quality threshold (e.g., as at 614). For example, 710 may be performed by the empirical mutual information component 842.

At 712, the UE may transmit, to the base station, a first request that data transmissions to the second wireless device have the second modulation order (e.g., as at 616). For example, 712 may be performed by the empirical mutual information component 842.

At 714, the UE may aperiodically receive data from the base station, the data being modulated with the second modulation order (e.g., as at 618). For example, 714 may be performed by the pseudo-random data and training signal component 840.

At 716, the UE may estimate, based on the received second training signal and through the MI estimation, a reception quality associated with at least one modulation order lower than or higher than the second modulation order (e.g., as at 620). For example, 716 may be performed by the empirical mutual information component 842.

At 718, the UE may determine a third modulation order of the at least one modulation order lower than or higher than the second modulation order based on the MI estimation, the third modulation order being estimated to provide a reception quality greater than or equal to the reception quality threshold and greater than a reception quality associated with the second modulation order (e.g., as at 622). For example, 718 may be performed by the empirical mutual information component 842.

At 720, the UE may transmit, to the base station, a second request that data transmissions to the second wireless device have the third modulation order (e.g., as at 624). For example, 720 may be performed by the empirical mutual information component 842.

At 722, the UE may aperiodically receive a third training signal including third pseudo-random data modulated with the third modulation order from the base station (e.g., as at 626). For example, 722 may be performed by the pseudo-random data and training signal component 840.

At 724, the UE may estimate, based on the received third training signal and through the MI estimation (e.g., as at 628). For example, 724 may be performed by the empirical mutual information component 842.

At 726, the UE may determine, based on the MI estimation, a specific coding rate when data is received that is modulated with the third modulation order (e.g., as at 630). For example, 726 may be performed by the empirical mutual information component 842.

At 728, the UE may transmit, to the base station, a third request that data transmissions to the second wireless device have the specific coding rate (e.g., as at 632). For example, 728 may be performed by the empirical mutual information component 842.

Figure 8:
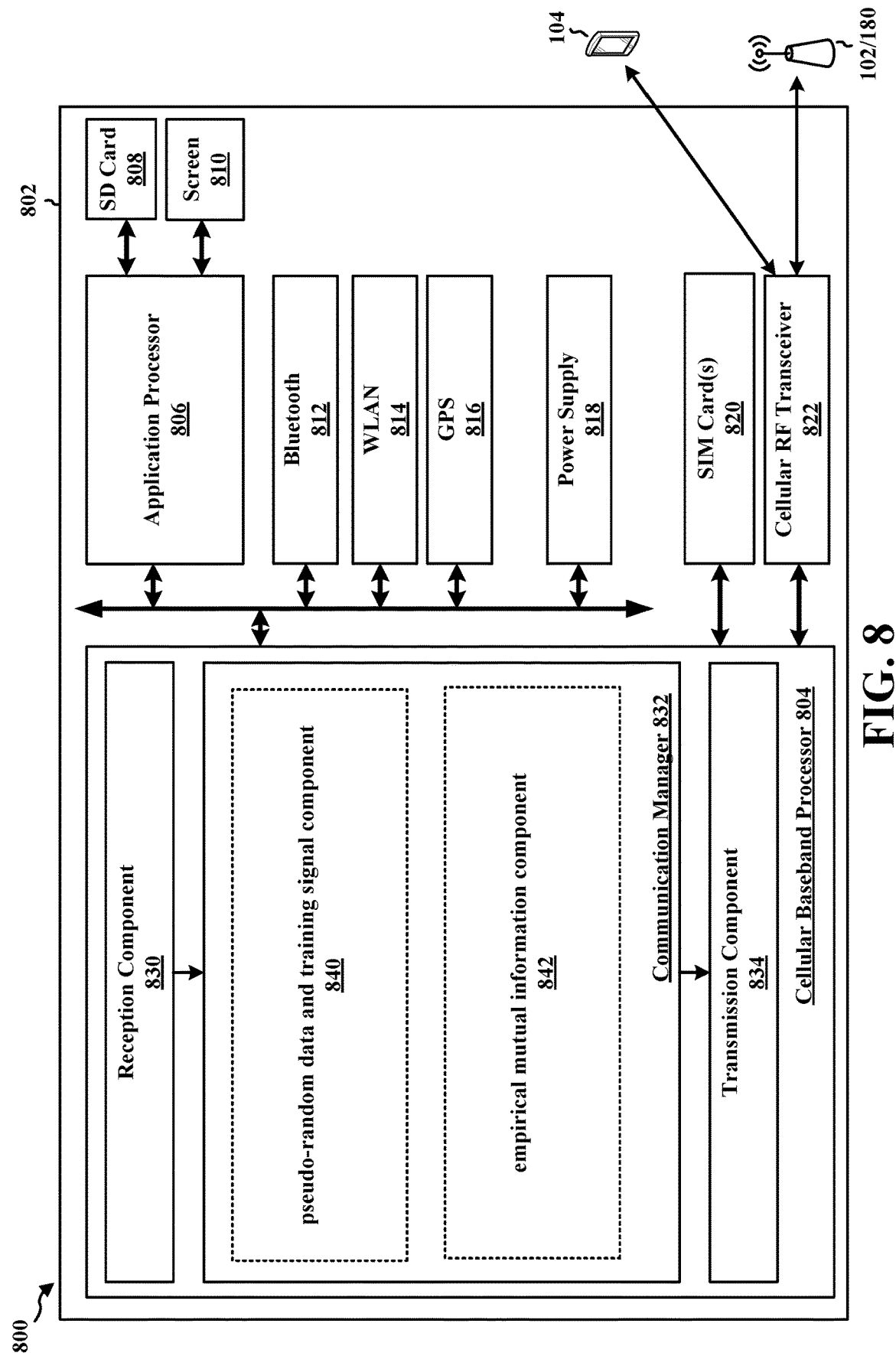
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a pseudo-random data and training signal component 840 that is configured to periodically receive a first training signal including first pseudo-random data from a base station, the first pseudo-random data being modulated with a first modulation order, generate the first pseudo-random data based on a seed known to the second wireless device, aperiodically receive data from the base station, the data being modulated with the second modulation order, aperiodically receive a third training signal including third pseudo-random data modulated with the third modulation order from the base station, e.g., as described in connection with 704, 706, 714, and 722. The communication manager 832 further includes an empirical mutual information component 842 that is configured to estimate, based on the received first training signal and through an MI estimation, a reception quality associated with at least one modulation order lower than or equal to the first modulation order, determine a second modulation order of the at least one modulation order lower than or equal to the first modulation order based on the MI estimation, the second modulation order being estimated to provide a reception quality greater than or equal to a reception quality threshold, transmit, to the base station, a first request that data transmissions to the second wireless device have the second modulation order, estimate, based on the received second training signal and through the MI estimation, a reception quality associated with at least one modulation order lower than or higher than the second modulation order, determine a third modulation order of the at least one modulation order lower than or higher than the second modulation order based on the MI estimation, the third modulation order being estimated to provide a reception quality greater than or equal to the reception quality threshold and greater than a reception quality associated with the second modulation order, transmit, to the base station, a second request that data transmissions to the second wireless device have the third modulation order, estimate, based on the received third training signal and through the MI estimation, determine, based on the MI estimation, a specific coding rate when data is received that is modulated with the third modulation order, and transmit, to the base station, a third request that data transmissions to the second wireless device have the specific coding rate, e.g., as described in connection with 708, 710, 712, 716, 718, 720, 724, 726, and 728.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for periodically receiving a training signal including first pseudo-random data from a first wireless device, the first pseudo-random data being modulated with a first modulation order; means for estimating, based on the received training signal and through a mutual information (MI) estimation, a reception quality associated with at least one modulation order lower than or equal to the first modulation order; means for determining a second modulation order of the at least one modulation order lower than or equal to the first modulation order based on the MI estimation, the second modulation order being estimated to provide a reception quality greater than or equal to a reception quality threshold; and means for transmitting, to the first wireless device, a first request that data transmissions to the second wireless device have the second modulation order. The apparatus 802 includes means for aperiodically receiving a training signal including second pseudo-random data modulated with the second modulation order from the first wireless device for the MI estimation; and means for transmitting, to the first wireless device, a third request that data transmissions from the first wireless device have a specific coding rate. The apparatus 802 also includes means for receiving data from the first wireless device using the MCS. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
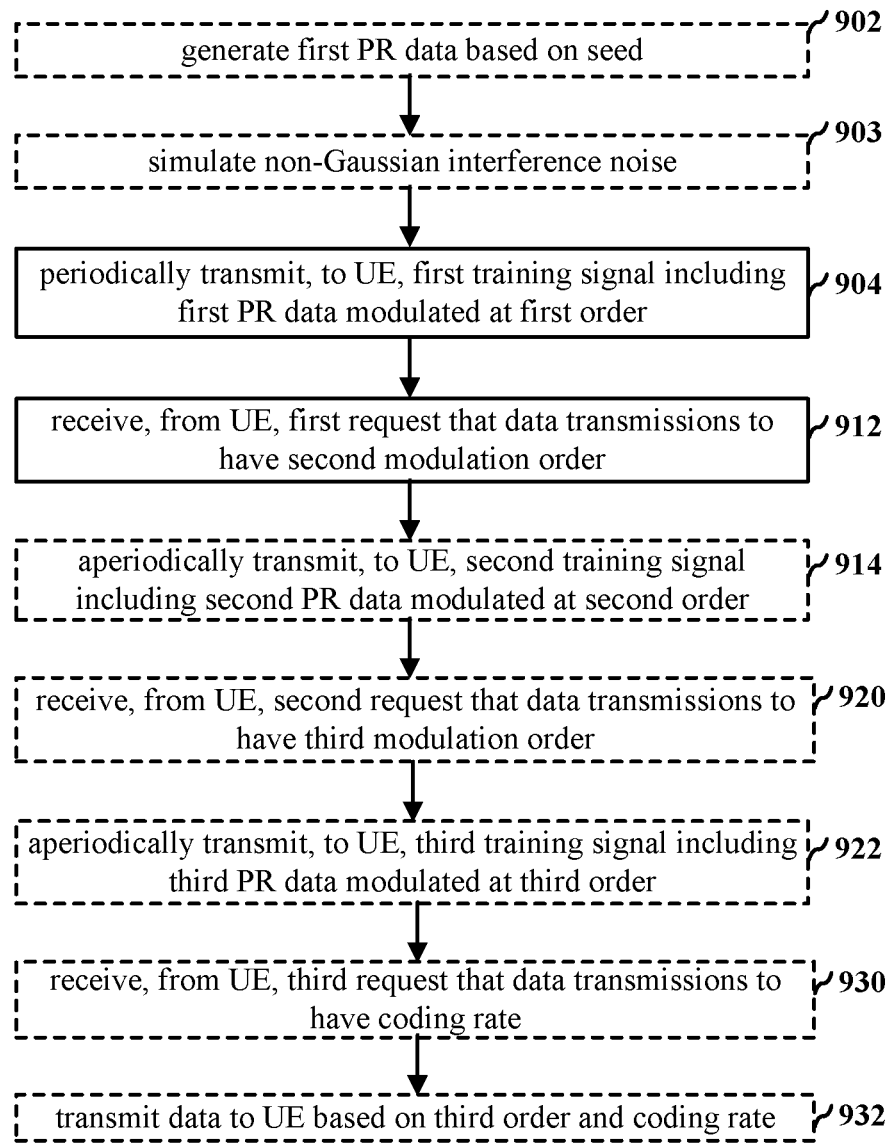
FIG. 9 is a flowchart of a method of wireless communication.

FIG. 9 is a flowchart 900 of a method of wireless communication. The method may be performed by a base station or a component of a base station (e.g., the base station 102/180; the apparatus 1002.)

At 902, the base station may generate a first pseudo-random data based on a seed known to a UE (e.g., as at 606). For example, 902 may be performed by a pseudo-random data and training signal component 1040.

At 903, the base station may simulate non-Gaussian interference noise by transmitting or receiving signal with relevant wireless devices or instructing the relevant wireless devices to transmit signal (e.g., as at 607). For example, 903 may be performed by an empirical mutual information component 1042.

At 904, the base station may periodically transmit a first training signal including the first pseudo random data to the UE for a MI estimation at the UE, the first pseudo random data being modulated with a first modulation order (e.g., as at 608). For example, 904 may be performed by the pseudo-random data and training signal component 1040.

At 912, the base station may receive, from the UE, a first request that data transmissions to the UE have a second modulation order, the second modulation order being less than or equal to the first modulation order, the first request being based on the transmitted first training signal including the first pseudo random data (e.g., as at 616). For example, 912 may be performed by the empirical mutual information component 1042.

At 914, the base station may aperiodically transmit a second training signal including second pseudo random data modulated with the second modulation order to the UE for the MI estimation at the UE (e.g., as at 618). For example, 914 may be performed by the pseudo-random data and training signal component 1040.

At 920, the base station may receive, from the UE, a second request that data transmissions to the UE have a third modulation order (e.g., as at 624). For example, 920 may be performed by the empirical mutual information component 1042.

At 922, the base station may aperiodically transmit a third training signal including third pseudo random data modulated with the third modulation order to the UE for the MI estimation at the UE (e.g., as at 626). For example, 922 may be performed by the pseudo-random data and training signal component 1040.

At 930, the base station may receive, from the UE, a third request that data transmissions to the UE have a specific coding rate (e.g., as at 632). At 932, the base station may transmit data to the UE based on the third modulation order and the specific coding rate (e.g., as at 634). For example, 930 may be performed by the empirical mutual information component 1042.

Figure 10:
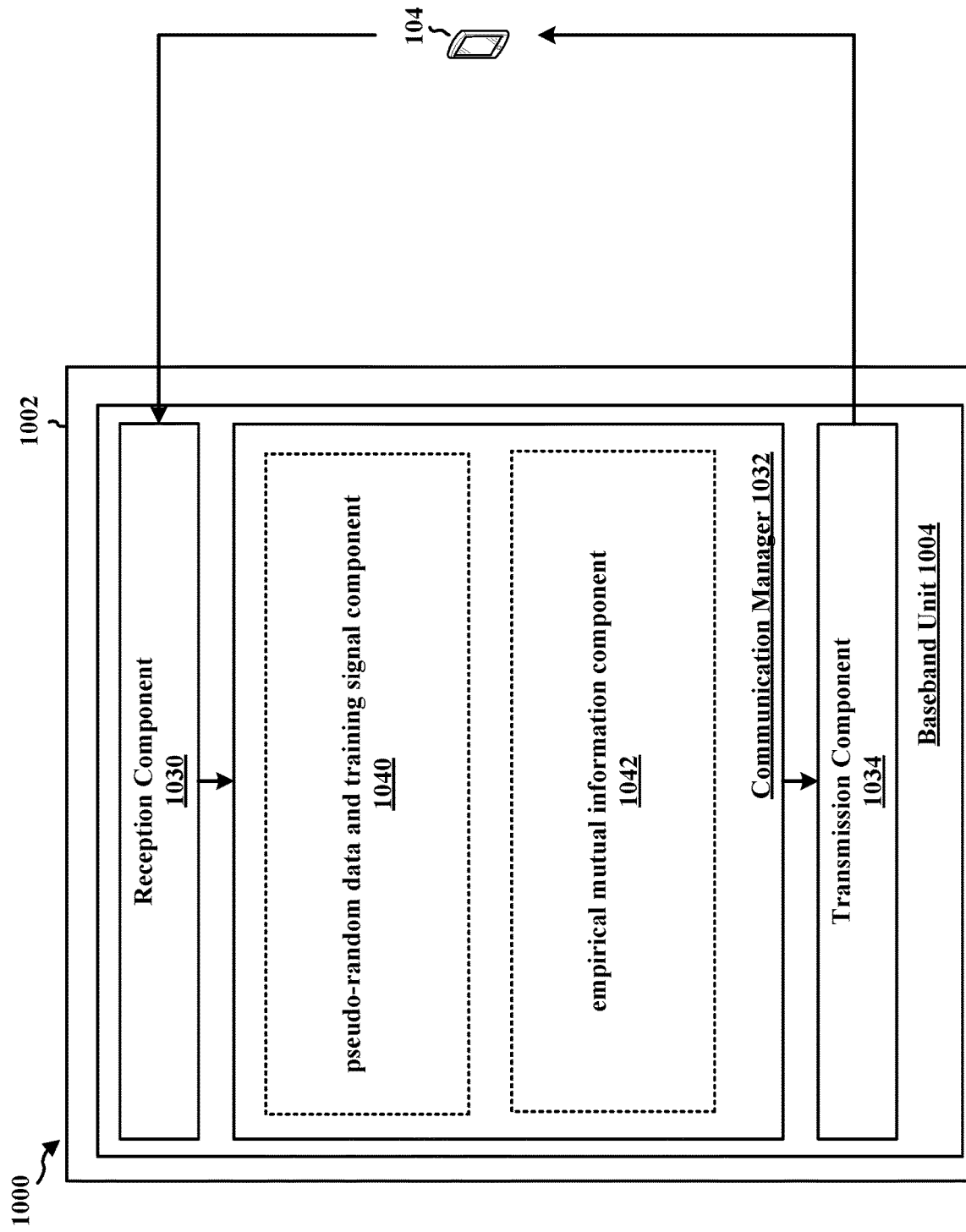
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a pseudo-random data and training signal component 1040 that is configured to generate a first pseudo-random data based on a seed known to a UE, periodically transmit a first training signal including the first pseudo random data to the UE for a MI estimation at the UE, the first pseudo random data being modulated with a first modulation order, aperiodically transmit second and third training signal including second pseudo random data modulated with the second and third modulation order to the UE for the MI estimation at the UE, e.g., as described in connection with 902, 904, 914, and 922.

The communication manager 1032 further includes an empirical mutual information component 1042 that is configured to receive, from the UE, a first request that data transmissions to the UE have a second modulation order, simulate non-Gaussian interference noise by transmitting or receiving signal with relevant wireless devices or instructing the relevant wireless devices to transmit signal, the second modulation order being less than or equal to the first modulation order, the first request being based on the transmitted first training signal including the first pseudo random data, receive, from the UE, a second request that data transmissions to the UE have a third modulation order, and receive, from the UE, a third request that data transmissions to the UE have a specific coding rate, e.g., as described in connection with 903, 912, 920, and 930.

The apparatus may include additional components that perform each of the blocks of the algorithm in the aforementioned flowcharts of FIGS. 6 and 9. As such, each block in the aforementioned flowcharts of FIGS. 6 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for periodically transmitting a training signal including first pseudo-random data to a second wireless device for an MI estimation at the second wireless device, the first pseudo-random data being modulated with a first modulation order, and means for receiving, from the second wireless device, a first request that data transmissions to the second wireless device have a second modulation order, the second modulation order being less than or equal to the first modulation order, the first request being based on the transmitted first training signal including the first pseudo-random data. The apparatus 1002 includes means for generating the first pseudo-random data based on a seed known to the second wireless device. The apparatus 1002 includes means for aperiodically transmitting a training signal including second pseudo-random data modulated with the second modulation order to the second wireless device for the MI estimation at the second wireless device; and means for receiving, from the second wireless device, a third request that data transmissions to the second wireless device have a specific coding rate. The apparatus 1002 also includes means for transmitting data to the second wireless device using the MCS. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Referring again to FIGS. 4, 5, 6, 7, 8, 9, and 10, a first wireless device may generate a first pseudo-random data based on a seed known to a second wireless device, and may transmit a first training signal including first pseudo-random data to the second wireless device for a MI estimation at the second wireless device, the first pseudo-random data being modulated with a first modulation order. The second wireless device may estimate, based on the received first training signal and through the MI estimation, a reception quality associated with at least one modulation order lower than or equal to the first modulation order, and determine a second modulation order of the at least one modulation order lower than or equal to the first modulation order based on the MI estimation, the second modulation order being estimated to provide a reception quality greater than or equal to a reception quality threshold. The MI estimation may be periodic or aperiodic.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication of a first wireless device, including: transmitting a first training signal including first pseudo-random data to a second wireless device for a mutual information (MI) estimation at the second wireless device, the first pseudo-random data being modulated with a first modulation order; and receiving, from the second wireless device, a first request that data transmissions to the second wireless device have a second modulation order, the second modulation order being less than or equal to the first modulation order, the first request being based on the transmitted first training signal including the first pseudo-random data.

Example 2 is the method of example 1, further including generating the first pseudo-random data based on a seed known to the second wireless device.

Example 3 is the method of any of Examples 1 and 2, further including transmitting data to the second wireless device using the second modulation order.

Example 4 is the method of any of Examples 1 to 3, further including transmitting a second training signal including second pseudo-random data modulated with the second modulation order to the second wireless device for the MI estimation at the second wireless device; and receiving, from the second wireless device, a second request that data transmissions to the second wireless device have a specific coding rate.

Example 5 is the method of any of Examples 1 to 4, where the second training signal is transmitted aperiodically based on the first request.

Example 6 is the method of any of Examples 1 to 5, further including determining whether the first request associated with the second modulation order is a new request for the second modulation order or a change in the requested modulation order, where the second training signal is transmitted when the first request is a new request for the second modulation order or a change in the requested modulation order Example 7 is the method of any of Examples 1 to 6, further including transmitting data to the second wireless device using a modulation coding scheme (MCS) with the second modulation order and the specific coding rate.

Example 8 is the method of any of Examples 1 to 7, further including transmitting a second training signal including second pseudo-random data to the second wireless device for the MI estimation at the second wireless device, the second pseudo-random data being modulated with the second modulation order; and receiving, from the second wireless device, a second request that data transmissions to the second wireless device have a third modulation order, the third modulation order being different from the second modulation order, the second request being based on the transmitted second training signal including the second pseudo-random data.

Example 9 is the method of any of Examples 1 to 8, further including transmitting a third training signal including third pseudo-random data modulated with the third modulation order to the second wireless device for the MI estimation at the second wireless device, receiving, from the second wireless device, a third request that data transmissions to the second wireless device have a specific coding rate Example 10 is the method of any of Examples 1 to 9, further including transmitting data to the second wireless device using a modulation coding scheme (MCS) with the third modulation order and the specific coding rate.

Example 11 is the method of any of Examples 1 to 10, further including receiving, from the second wireless device, a modulation order request to change the second modulation order to a different modulation order, where the second training signal is transmitted to the second wireless device based on the received modulation order request.

Example 12 is the method of any of Examples 1 to 11, where the first modulation order is a highest modulation order.

Example 13 is the method of any of Examples 1 to 12, where the first training signal including the first pseudo-random data is transmitted periodically.

Example 14 is the method of any of Examples 1 to 13, where the first training signal is transmitted through each communication link with the second wireless device.

Example 15 is the method of any of Examples 1 to 14, further including simulating non-Gaussian interference noise by transmitting or receiving signal with relevant wireless devices or instructing the relevant wireless devices to transmit signal.

Example 16 is a device including one or more processors and one or more memories in electronic communication with the one or more processors storing instructions executable by the one or more processors to cause the device to implement a method as in any of Examples 1-15.

Example 17 is a system or apparatus including means for implementing a method or realizing an apparatus as in any of Examples 1-15.

Example 18 is a non-transitory computer readable medium storing instructions executable by one or more processors to cause the one or more processors to implement a method as in any of Examples 1-15.

Example 19 is a method of wireless communication of a second wireless device, including: receiving a first training signal including first pseudo-random data from a first wireless device, the first pseudo-random data being modulated with a first modulation order; estimating, based on the received first training signal and through a mutual information (MI) estimation, a reception quality associated with at least one modulation order lower than or equal to the first modulation order; determining a second modulation order of the at least one modulation order lower than or equal to the first modulation order based on the MI estimation, the second modulation order being estimated to provide a reception quality greater than or equal to a reception quality threshold; and transmitting, to the first wireless device, a first request that data transmissions to the second wireless device have the second modulation order.

Example 20 is a method of Example 19, further including generating the first pseudo-random data based on a seed known to the second wireless device, where the MI estimation is based on comparing the generated first pseudo-random data with the first pseudo-random data received in the first training signal.

Example 21 is a method of any of Examples 19 and 20, further including receiving data from the first wireless device, the data being modulated with the second modulation order.

Example 22 is a method of any of Examples 19 to 21, further including receiving a second training signal including second pseudo-random data modulated with the second modulation order from the first wireless device; determining, based on the MI estimation, a specific coding rate when data is received modulated with the second modulation order; and transmitting, to the first wireless device, a second request that data transmissions to the second wireless device have the specific coding rate.

Example 23 is a method of any of Examples 19 to 22, where the second training signal is received aperiodically based on the transmitted first request.

Example 24 is a method of any of Examples 19 to 23, further including receiving data from the first wireless device, the data being modulated and coded with a modulation coding scheme (MCS) including the second modulation order and the specific coding rate.

Example 25 is a method of any of Examples 19 to 24, further including receiving a second training signal including second pseudo-random data from the first wireless device, the second pseudo-random data being modulated with the second modulation order; estimating, based on the received second training signal and through the MI estimation, a reception quality associated with at least one modulation order lower than or higher than the second modulation order; determining a third modulation order of the at least one modulation order lower than or higher than the second modulation order based on the MI estimation, the third modulation order being estimated to provide a reception quality greater than or equal to the reception quality threshold and greater than a reception quality associated with the second modulation order; and transmitting, to the first wireless device, a second request that data transmissions to the second wireless device have the third modulation order.

Example 26 is a method of any of Examples 19 to 25, further including receiving a third training signal including third pseudo-random data modulated with the third modulation order from the first wireless device; determining, based on the MI estimation, a specific coding rate when data is received modulated with the third modulation order; and transmitting, to the first wireless device, a third request that data transmissions to the second wireless device have the specific coding rate.

Example 27 is a method of any of Examples 19 to 26, further including receiving data from the first wireless device, the data being modulated and coded with a modulation coding scheme (MCS) including the third modulation order and the specific coding rate.

Example 28 is a method of any of Examples 19 to 27, further including transmitting, to the first wireless device, a modulation order request to change the second modulation order to a different modulation order, where the second training signal is received from the first wireless device based on the transmitted modulation order request.

Example 29 is a method of any of Examples 19 to 28, where the first modulation order is a highest modulation order.

Example 30 is a method of any of Examples 19 to 29, where the first training signal including the first pseudo-random data is received periodically.

Example 31 is a method of any of Examples 19 to 30, where the first training signal is received through each communication link with the first wireless device.

Example 32 is a method of any of Examples 19 to 31, further including transmitting to a third wireless device while concurrently receiving the first training signal from the first wireless device via at least one communication link with the first wireless device, the MI estimation being based on self-mutual interference as a result of the concurrent transmission to the third wireless device and the reception of the first training signal from the first wireless device.

Example 33 is a device including one or more processors and one or more memories in electronic communication with the one or more processors storing instructions executable by the one or more processors to cause the device to implement a method as in any of Examples 19-32.

Example 34 is a system or apparatus including means for implementing a method or realizing an apparatus as in any of Examples 19-32.

Example 35 is a non-transitory computer readable medium storing instructions executable by one or more processors to cause the one or more processors to implement a method as in any of Examples 19-32.

What is claimed is:

1. A method of wireless communication of a first wireless device, comprising:
    transmitting a first training signal including first pseudo-random data to a second wireless device for a mutual information (MI) estimation at the second wireless device, the first pseudo-random data being modulated with a first modulation order; and
    receiving, from the second wireless device, a first request that data transmissions to the second wireless device have a second modulation order, the second modulation order being less than or equal to the first modulation order, the first request being based on the transmitted first training signal including the first pseudo-random data.

2. The method of claim 1, further comprising generating the first pseudo-random data based on a seed known to the second wireless device.

3. The method of claim 1, further comprising transmitting data to the second wireless device using the second modulation order.

4. The method of claim 1, further comprising:
    transmitting a second training signal including second pseudo-random data modulated with the second modulation order to the second wireless device for the MI estimation at the second wireless device; and
    receiving, from the second wireless device, a second request that data transmissions to the second wireless device have a specific coding rate.

5. The method of claim 4, wherein the second training signal is transmitted aperiodically based on the first request.

6. The method of claim 5, further comprising determining whether the first request associated with the second modulation order is a new request for the second modulation order or a change in the requested modulation order,
    wherein the second training signal is transmitted when the first request is a new request for the second modulation order or a change in the requested modulation order.

7. The method of claim 4, further comprising transmitting data to the second wireless device using a modulation coding scheme (MCS) with the second modulation order and the specific coding rate.

8. The method of claim 1, further comprising:
    transmitting a second training signal including second pseudo-random data to the second wireless device for the MI estimation at the second wireless device, the second pseudo-random data being modulated with the second modulation order; and
    receiving, from the second wireless device, a second request that data transmissions to the second wireless device have a third modulation order, the third modulation order being different from the second modulation order, the second request being based on the transmitted second training signal including the second pseudo-random data.

9. The method of claim 8, further comprising:
    transmitting a third training signal including third pseudo-random data modulated with the third modulation order to the second wireless device for the MI estimation at the second wireless device; and receiving, from the second wireless device, a third request that data transmissions to the second wireless device have a specific coding rate.

10. The method of claim 9, further comprising transmitting data to the second wireless device using a modulation coding scheme (MCS) with the third modulation order and the specific coding rate.

11. The method of claim 8, further comprising receiving, from the second wireless device, a modulation order request to change the second modulation order to a different modulation order, wherein the second training signal is transmitted to the second wireless device based on the received modulation order request.

12. The method of claim 1, wherein the first modulation order is a highest modulation order.

13. The method of claim 1, wherein the first training signal including the first pseudo-random data is transmitted periodically.

14. The method of claim 1, wherein the first training signal is transmitted through each communication link with the second wireless device.

15. The method of claim 1, further comprising simulating non-Gaussian interference noise by at least one of transmitting or receiving signal with relevant wireless devices or instructing the relevant wireless devices to transmit signal.

16. An apparatus for wireless communication of a first wireless device, comprising:
    means for transmitting a first training signal including first pseudo-random data to a second wireless device for a mutual information (MI) estimation at the second wireless device, the first pseudo-random data being modulated with a first modulation order; and
    means for receiving, from the second wireless device, a first request that data transmissions to the second wireless device have a second modulation order, the second modulation order being less than or equal to the first modulation order, the first request being based on the transmitted first training signal including the first pseudo-random data.

17. The apparatus of claim 16, further comprising means for generating the first pseudo-random data based on a seed known to the second wireless device.

18. The apparatus of claim 16, further comprising means for transmitting data to the second wireless device using the second modulation order.

19. The apparatus of claim 16, further comprising:
    means for transmitting a second training signal including second pseudo-random data modulated with the second modulation order to the second wireless device for the MI estimation at the second wireless device; and
    means for receiving, from the second wireless device, a second request that data transmissions to the second wireless device have a specific coding rate.

20. The apparatus of claim 19, wherein the second training signal is transmitted aperiodically based on the first request.

21. The apparatus of claim 20, further comprising means for determining whether the first request associated with the second modulation order is a new request for the second modulation order or a change in the requested modulation order,
    wherein the second training signal is transmitted when the first request is a new request for the second modulation order or a change in the requested modulation order.

22. The apparatus of claim 19, further comprising means for transmitting data to the second wireless device using a modulation coding scheme (MCS) with the second modulation order and the specific coding rate.

23. The apparatus of claim 16, further comprising:
    means for transmitting a second training signal including second pseudo-random data to the second wireless device for the MI estimation at the second wireless device, the second pseudo-random data being modulated with the second modulation order; and
    means for receiving, from the second wireless device, a second request that data transmissions to the second wireless device have a third modulation order, the third modulation order being different from the second modulation order, the second request being based on the transmitted second training signal including the second pseudo-random data.

24. The apparatus of claim 23, further comprising:
    means for transmitting a third training signal including third pseudo-random data modulated with the third modulation order to the second wireless device for the MI estimation at the second wireless device; and
    means for receiving, from the second wireless device, a third request that data transmissions to the second wireless device have a specific coding rate.

25. The apparatus of claim 24, further comprising means for transmitting data to the second wireless device using a modulation coding scheme (MCS) with the third modulation order and the specific coding rate.

26. The apparatus of claim 23, further comprising means for receiving, from the second wireless device, a modulation order request to change the second modulation order to a different modulation order, wherein the second training signal is transmitted to the second wireless device based on the received modulation order request.

27. The apparatus of claim 16, wherein the first modulation order is a highest modulation order.

28. The apparatus of claim 16, wherein the first training signal including the first pseudo-random data is transmitted periodically.

29. The apparatus of claim 16, wherein the first training signal is transmitted through each communication link with the second wireless device.

30. The apparatus of claim 16, further comprising means for simulating non-Gaussian interference noise by transmitting or receiving signal with relevant wireless devices or instructing the relevant wireless devices to transmit signal.

31. An apparatus for wireless communication of a first wireless device, comprising:
    a memory; and
    at least one processor coupled to the memory and configured to:
        transmit a first training signal including first pseudo-random data to a second wireless device for a mutual information (MI) estimation at the second wireless device, the first pseudo-random data being modulated with a first modulation order; and
        receive, from the second wireless device, a first request that data transmissions to the second wireless device have a second modulation order, the second modulation order being less than or equal to the first modulation order, the first request being based on the transmitted first training signal including the first pseudo-random data.

32. The apparatus of claim 31, wherein the at least one processor is further configured to generate the first pseudo-random data based on a seed known to the second wireless device.

33. The apparatus of claim 31, wherein the at least one processor is further configured to transmit data to the second wireless device using the second modulation order.

34. The apparatus of claim 31, wherein the at least one processor is further configured to:
 transmit a second training signal including second pseudo-random data modulated with the second modulation order to the second wireless device for the MI estimation at the second wireless device, and
 receive, from the second wireless device, a second request that data transmissions to the second wireless device have a specific coding rate.

35. The apparatus of claim 34, wherein the second training signal is transmitted aperiodically based on the first request.

36. The apparatus of claim 35, wherein the at least one processor is further configured to determine whether the first request associated with the second modulation order is a new request for the second modulation order or a change in the requested modulation order,
 wherein the second training signal is transmitted when the first request is a new request for the second modulation order or a change in the requested modulation order.

37. The apparatus of claim 35, wherein the at least one processor is further configured to transmit data to the second wireless device using a modulation coding scheme (MCS) with the second modulation order and the specific coding rate.

38. The apparatus of claim 31, wherein the at least one processor is further configured to:
 transmit a second training signal including second pseudo-random data to the second wireless device for the MI estimation at the second wireless device, the second pseudo-random data being modulated with the second modulation order; and
 receive, from the second wireless device, a second request that data transmissions to the second wireless device have a third modulation order, the third modulation order being different from the second modulation order, the second request being based on the transmitted second training signal including the second pseudo-random data.

39. The apparatus of claim 38, wherein the at least one processor is further configured to:
 transmit a third training signal including third pseudo-random data modulated with the third modulation order to the second wireless device for the MI estimation at the second wireless device, and
 receive, from the second wireless device, a third request that data transmissions to the second wireless device have a specific coding rate.

40. The apparatus of claim 39, wherein the at least one processor is further configured to transmit data to the second wireless device using a modulation coding scheme (MCS) with the third modulation order and the specific coding rate.

41. The apparatus of claim 38, wherein the at least one processor is further configured to receive, from the second wireless device, a modulation order request to change the second modulation order to a different modulation order, wherein the second training signal is transmitted to the second wireless device based on the received modulation order request.

42. The apparatus of claim 31, wherein the first modulation order is a highest modulation order.

43. The apparatus of claim 31, wherein the first training signal including the first pseudo-random data is transmitted periodically.

44. The apparatus of claim 31, wherein the first training signal is transmitted through each communication link with the second wireless device.

45. The apparatus of claim 31, wherein the at least one processor is further configured to simulate non-Gaussian interference noise by transmitting or receiving signal with relevant wireless devices or instructing the relevant wireless devices to transmit signal.

46. A non-transitory computer-readable medium storing computer executable code for a first wireless device, the code when executed by a processor causes the processor to:
 transmit a first training signal including first pseudo-random data to a second wireless device for a mutual information (MI) estimation at the second wireless device, the first pseudo-random data being modulated with a first modulation order; and
 receive, from the second wireless device, a first request that data transmissions to the second wireless device have a second modulation order, the second modulation order being less than or equal to the first modulation order, the first request being based on the transmitted first training signal including the first pseudo-random data.

47. A method of wireless communication of a second wireless device, comprising:
 receiving a first training signal including first pseudo-random data from a first wireless device, the first pseudo-random data being modulated with a first modulation order;
 estimating, based on the received first training signal and through a mutual information (MI) estimation, a reception quality associated with at least one modulation order lower than or equal to the first modulation order;
 determining a second modulation order of the at least one modulation order lower than or equal to the first modulation order based on the MI estimation, the second modulation order being estimated to provide a reception quality greater than or equal to a reception quality threshold; and
 transmitting, to the first wireless device, a first request that data transmissions to the second wireless device have the second modulation order.

48. The method of claim 47, further comprising generating the first pseudo-random data based on a seed known to the second wireless device, wherein the MI estimation is based on comparing the generated first pseudo-random data with the first pseudo-random data received in the first training signal.

49. The method of claim 47, further comprising receiving data from the first wireless device, the data being modulated with the second modulation order.

50. The method of claim 47, further comprising:
 receiving a second training signal including second pseudo-random data modulated with the second modulation order from the first wireless device;
 determining, based on the MI estimation, a specific coding rate when data is received modulated with the second modulation order; and
 transmitting, to the first wireless device, a second request that data transmissions to the second wireless device have the specific coding rate.

51. The method of claim 50, wherein the second training signal is received aperiodically based on the transmitted first request.

52. The method of claim 50, further comprising receiving data from the first wireless device, the data being modulated and coded with a modulation coding scheme (MCS) including the second modulation order and the specific coding rate.

53. The method of claim 47, further comprising:
receiving a second training signal including second pseudo-random data from the first wireless device, the second pseudo-random data being modulated with the second modulation order;
estimating, based on the received second training signal and through the MI estimation, a reception quality associated with at least one modulation order lower than or higher than the second modulation order;
determining a third modulation order of the at least one modulation order lower than or higher than the second modulation order based on the MI estimation, the third modulation order being estimated to provide a reception quality greater than or equal to the reception quality threshold and greater than a reception quality associated with the second modulation order; and
transmitting, to the first wireless device, a second request that data transmissions to the second wireless device have the third modulation order.

54. The method of claim 53, further comprising:
receiving a third training signal including third pseudo-random data modulated with the third modulation order from the first wireless device;
determining, based on the MI estimation, a specific coding rate when data is received modulated with the third modulation order; and
transmitting, to the first wireless device, a third request that data transmissions to the second wireless device have the specific coding rate.

55. The method of claim 54, further comprising receiving data from the first wireless device, the data being modulated and coded with a modulation coding scheme (MCS) including the third modulation order and the specific coding rate.

56. The method of claim 53, further comprising transmitting, to the first wireless device, a modulation order request to change the second modulation order to a different modulation order, wherein the second training signal is received from the first wireless device based on the transmitted modulation order request.

57. The method of claim 47, wherein the first modulation order is a highest modulation order.

58. The method of claim 47, wherein the first training signal including the first pseudo-random data is received periodically.

59. The method of claim 47, wherein the first training signal is received through each communication link with the first wireless device.

60. The method of claim 56, further comprising transmitting to a third wireless device while concurrently receiving the first training signal from the first wireless device via at least one communication link with the first wireless device, the MI estimation being based on self-mutual interference as a result of the concurrent transmission to the third wireless device and the reception of the first training signal from the first wireless device.

61. An apparatus for wireless communication of a second wireless device, comprising:
means for receiving a first training signal including first pseudo-random data from a first wireless device, the first pseudo-random data being modulated with a first modulation order;
means for estimating, based on the received first training signal and through a mutual information (MI) estimation, a reception quality associated with at least one modulation order lower than or equal to the first modulation order;
means for determining a second modulation order of the at least one modulation order lower than or equal to the first modulation order based on the MI estimation, the second modulation order being estimated to provide a reception quality greater than or equal to a reception quality threshold; and
means for transmitting, to the first wireless device, a first request that data transmissions to the second wireless device have the second modulation order.

62. The apparatus of claim 61, further comprising means for generating the first pseudo-random data based on a seed known to the second wireless device, wherein the MI estimation is based on comparing the generated first pseudo-random data with the first pseudo-random data received in the first training signal.

63. The apparatus of claim 61, further comprising means for receiving data from the first wireless device, the data being modulated with the second modulation order.

64. The apparatus of claim 61, further comprising:
means for receiving a second training signal including second pseudo-random data modulated with the second modulation order from the first wireless device;
means for determining, based on the MI estimation, a specific coding rate when data is received modulated with the second modulation order; and
means for transmitting, to the first wireless device, a second request that data transmissions to the second wireless device have the specific coding rate.

65. The apparatus of claim 64, wherein the second training signal is received aperiodically based on the transmitted first request.

66. The apparatus of claim 64, further comprising means for receiving data from the first wireless device, the data being modulated and coded with a modulation coding scheme (MCS) including the second modulation order and the specific coding rate.

67. The apparatus of claim 61, further comprising:
means for receiving a second training signal including second pseudo-random data from the first wireless device, the second pseudo-random data being modulated with the second modulation order;
means for estimating, based on the received second training signal and through the MI estimation, a reception quality associated with at least one modulation order lower than or higher than the second modulation order;
means for determining a third modulation order of the at least one modulation order lower than or higher than the second modulation order based on the MI estimation, the third modulation order being estimated to provide a reception quality greater than or equal to the reception quality threshold and greater than a reception quality associated with the second modulation order; and
means for transmitting, to the first wireless device, a second request that data transmissions to the second wireless device have the third modulation order.

68. The apparatus of claim 67, further comprising:
means for receiving a third training signal including third pseudo-random data modulated with the third modulation order from the first wireless device;
means for determining, based on the MI estimation, a specific coding rate when data is received modulated with the third modulation order; and means for transmitting, to the first wireless device, a third request that data transmissions to the second wireless device have the specific coding rate.

69. The apparatus of claim 68, further comprising means for receiving data from the first wireless device, the data being modulated and coded with a modulation coding scheme (MCS) including the third modulation order and the specific coding rate.

70. The apparatus of claim 67, further comprising means for transmitting, to the first wireless device, a modulation order request to change the second modulation order to a different modulation order, wherein the second training signal is received from the first wireless device based on the transmitted modulation order request.

71. The apparatus of claim 61, wherein the first modulation order is a highest modulation order.

72. The apparatus of claim 61, wherein the first training signal including the first pseudo-random data is received periodically.

73. The apparatus of claim 61, wherein the first training signal is received through each communication link with the first wireless device.

74. The apparatus of claim 73, further comprising means for transmitting to a third wireless device while concurrently receiving the first training signal from the first wireless device via at least one communication link with the first wireless device, the MI estimation being based on self-mutual interference as a result of the concurrent transmission to the third wireless device and the reception of the first training signal from the first wireless device.

75. An apparatus for wireless communication of a second wireless device, comprising:
   a memory; and
   at least one processor coupled to the memory and configured to:
      receive a first training signal including first pseudo-random data from a first wireless device, the first pseudo-random data being modulated with a first modulation order;
      estimate, based on the received first training signal and through a mutual information (MI) estimation, a reception quality associated with at least one modulation order lower than or equal to the first modulation order;
      determine a second modulation order of the at least one modulation order lower than or equal to the first modulation order based on the MI estimation, the second modulation order being estimated to provide a reception quality greater than or equal to a reception quality threshold; and
      transmit, to the first wireless device, a first request that data transmissions to the second wireless device have the second modulation order.

76. The apparatus of claim 75, wherein the at least one processor is further configured to generate the first pseudo-random data based on a seed known to the second wireless device, wherein the MI estimation is based on comparing the generated first pseudo-random data with the first pseudo-random data received in the first training signal.

77. The apparatus of claim 75, wherein the at least one processor is further configured to receive data from the first wireless device, the data being modulated with the second modulation order.

78. The apparatus of claim 75, wherein the at least one processor is further configured to:

receive a second training signal including second pseudo-random data modulated with the second modulation order from the first wireless device;
determine, based on the MI estimation, a specific coding rate when data is received modulated with the second modulation order; and
transmit, to the first wireless device, a second request that data transmissions to the second wireless device have the specific coding rate.

79. The apparatus of claim 78, wherein the second training signal is received aperiodically based on the transmitted first request.

80. The apparatus of claim 78, wherein the at least one processor is further configured to receive data from the first wireless device, the data being modulated and coded with a modulation coding scheme (MCS) including the second modulation order and the specific coding rate.

81. The apparatus of claim 75, wherein the at least one processor is further configured to:
   receive a second training signal including second pseudo-random data from the first wireless device, the second pseudo-random data being modulated with the second modulation order;
   estimate, based on the received second training signal and through the MI estimation, a reception quality associated with at least one modulation order lower than or higher than the second modulation order;
   determine a third modulation order of the at least one modulation order lower than or higher than the second modulation order based on the MI estimation, the third modulation order being estimated to provide a reception quality greater than or equal to the reception quality threshold and greater than a reception quality associated with the second modulation order; and
   transmit, to the first wireless device, a second request that data transmissions to the second wireless device have the third modulation order.

82. The apparatus of claim 81, wherein the at least one processor is further configured to:
   receive a third training signal including third pseudo-random data modulated with the third modulation order from the first wireless device;
   determine, based on the MI estimation, a specific coding rate when data is received modulated with the third modulation order; and
   transmit, to the first wireless device, a third request that data transmissions to the second wireless device have the specific coding rate.

83. The apparatus of claim 82, wherein the at least one processor is further configured to receive data from the first wireless device, the data being modulated and coded with a modulation coding scheme (MCS) including the third modulation order and the specific coding rate.

84. The apparatus of claim 81, wherein the at least one processor is further configured to transmit, to the first wireless device, a modulation order request to change the second modulation order to a different modulation order, wherein the second training signal is received from the first wireless device based on the transmitted modulation order request.

85. The apparatus of claim 75, wherein the first modulation order is a highest modulation order.

86. The apparatus of claim 75, wherein the first training signal including the first pseudo-random data is received periodically.

87. The apparatus of claim 75, wherein the first training signal is received through each communication link with the first wireless device.

88. The apparatus of claim 87, wherein the at least one processor is further configured to transmit to a third wireless device while concurrently receiving the first training signal from the first wireless device via at least one communication link with the first wireless device, the MI estimation being based on self-mutual interference as a result of the concurrent transmission to the third wireless device and the reception of the first training signal from the first wireless device.

89. A non-transitory computer-readable medium storing computer executable code for a second wireless device, the code when executed by a processor causes the processor to:
- receive a first training signal including first pseudo-random data from a first wireless device, the first pseudo-random data being modulated with a first modulation order;
- estimate, based on the received first training signal and through a mutual information (MI) estimation, a reception quality associated with at least one modulation order lower than or equal to the first modulation order;
- determine a second modulation order of the at least one modulation order lower than or equal to the first modulation order based on the MI estimation, the second modulation order being estimated to provide a reception quality greater than or equal to a reception quality threshold; and
- transmit, to the first wireless device, a first request that data transmissions to the second wireless device have the second modulation order.

* * * * *